(12) United States Patent
Iavergne et al.

(10) Patent No.: US 7,181,517 B1
(45) Date of Patent: Feb. 20, 2007

(54) BROWSER-ENABLED REMOTE USER INTERFACE FOR TELECOMMUNICATIONS POWER SYSTEM

(75) Inventors: Marc Iavergne, Laval (CA); Louis Duguay, Dollard-des-Ormeaux (CA); Christian de Varennes, Montreal (CA)

(73) Assignee: Astec International Limited, Hong Kong (HK)

( * ) Notice: Subject to any disclaimer, the term of this patent is extended or adjusted under 35 U.S.C. 154(b) by 581 days.

(21) Appl. No.: 09/587,097

(22) Filed: Jun. 2, 2000

(51) Int. Cl.
  *G06F 15/16* (2006.01)
  *G06F 15/173* (2006.01)
  *G06F 11/00* (2006.01)
  *G01R 21/00* (2006.01)

(52) U.S. Cl. ............... 709/224; 709/223; 709/217; 702/62; 714/14; 714/22; 700/286

(58) Field of Classification Search ............ 709/217, 709/223–224; 702/57, 60, 62; 700/286; 714/14
See application file for complete search history.

(56) References Cited

U.S. PATENT DOCUMENTS

| | | | | |
|---|---|---|---|---|
| 5,381,554 A | * | 1/1995 | Langer et al. ............. | 714/14 |
| 5,650,936 A | * | 7/1997 | Loucks et al. ............ | 702/62 |
| 5,761,085 A | * | 6/1998 | Giorgio ................... | 702/33 |
| 5,805,458 A | * | 9/1998 | McNamara et al. ........ | 702/60 |
| 6,023,507 A | * | 2/2000 | Wookey .................. | 709/224 |
| 6,073,174 A | * | 6/2000 | Montgomerie et al. ..... | 709/224 |
| 6,122,603 A | * | 9/2000 | Budike, Jr. ............... | 702/182 |
| 6,236,949 B1 | * | 5/2001 | Hart ....................... | 702/64 |
| 6,434,533 B1 | * | 8/2002 | Fitzgerald ................ | 705/10 |
| 6,529,839 B1 | * | 3/2003 | Uggerud et al. ........... | 702/61 |
| 6,535,859 B1 | * | 3/2003 | Yablonowski et al. ...... | 705/412 |
| 6,553,418 B1 | * | 4/2003 | Collins et al. ............. | 709/224 |
| 6,571,153 B1 | * | 5/2003 | Maeda et al. ............. | 700/292 |
| 6,618,709 B1 | * | 9/2003 | Sneeringer ............... | 709/217 |
| 6,631,247 B1 | * | 10/2003 | Motoyama et al. ........ | 709/217 |
| 6,714,977 B1 | * | 3/2004 | Fowler et al. ............. | 709/224 |
| 6,741,915 B2 | * | 5/2004 | Poth ...................... | 700/276 |
| 6,925,335 B2 | * | 8/2005 | May et al. ................ | 700/9 |
| 6,944,555 B2 | * | 9/2005 | Blackett et al. ........... | 702/62 |
| 6,961,641 B1 | * | 11/2005 | Forth et al. ............... | 700/295 |
| 6,973,589 B2 | * | 12/2005 | Wright et al. ............. | 714/14 |
| 6,990,395 B2 | * | 1/2006 | Ransom et al. ........... | 700/295 |
| 7,009,510 B1 | * | 3/2006 | Douglass et al. .......... | 340/531 |
| 7,016,813 B2 | * | 3/2006 | Alexander et al. ......... | 702/188 |

\* cited by examiner

*Primary Examiner*—Ario Etienne
*Assistant Examiner*—Gregory G. Todd
(74) *Attorney, Agent, or Firm*—Harness, Dickey & Pierce, P.L.C.

(57) ABSTRACT

The modular master control unit of the telecommunications power system communicates via a data bus with the associated modular rectifier units, distribution unit(s) and battery connection unit(s) to collect operating state information from the neuron processors of those units and store that information in a database. The master control unit also controls the operation of the associated modular units by supplying operating state information, based on values stored in the database. The user interface manager module provides local user interface control over the system by allowing the user through a local display screen and touch pad to read from and write to the database. By downloading an applet to a remote computer running a web browser, the user interface manager allows users at remote locations to perform the same control and monitor functions as a user at the local site. The applet runs within the standard browser and communicates with the user interface manager using TCP/IP protocol.

28 Claims, 6 Drawing Sheets

BROWSER-ENABLED REMOTE USER INTERFACE FOR TELECOMMUNICATIONS POWER SYSTEM

BACKGROUND AND SUMMARY OF THE INVENTION

The present invention relates generally to power systems for telecommunications equipment and networks. More particularly, the invention relates to a distributed user interface technology to simplify the operation and control of power supply systems for telecommunications and networking applications.

The power system of a typical telephone central switching station or Internet routing station is a complex, modular system employing one or more rectifier subsystems and one or more power distribution subsystems connected through a common bus. Also, many power supply systems today have a controller that coordinates the operation of the rectifier and distribution subsystems. Frequently telecommunications systems require backup power, which is typically supplied through a large bank of storage batteries.

Interacting with this complex assemblage of components has heretofore required a fairly high level of technical skill. Skilled engineers are expensive. When it is necessary to make adjustments to the power supply system, or to monitor operating parameters and make appropriate configuration adjustments, traditionally the engineer or technician must visit the site where the power supply system is located so that the operating conditions may be observed and appropriate action taken. While some large installations may have engineers or technicians on staff, many smaller installations, particularly those located in rural areas, are normally unmanned. While it is possible to schedule routine maintenance visits to such remote sites, power supply systems for telecommunications equipment are also regularly subjected to electrical storms and other natural phenomena that create power outages on the electrical power grid to which the power supplies are connected. When AC power is lost due to a power outage, the power supply system will usually switch to reserve power, supplied by batteries or diesel-powered AC generators, or the like. Although the switchover to reserve power is automatic, the available reserve power is not endless. At some point, an engineer or technician may need to make a command decision as to which circuits will continue to be powered and which will be temporarily shut off. In the past, this would be done by making a personal visit to the site.

Electrical storms and other natural phenomena can sometimes create power outages over a widespread region. When such outages occur, it may become necessary for engineers and technicians to visit numerous sites, all within the time that reserve power is being maintained. When a large number of sites are without AC power due to an outage, engineers and technicians must work very efficiently. At such times, an easy to use, consistent user interface is a highly valuable asset.

There are, of course, numerous other situations in which an easy to use, consistent interface is desirable. For example, as the telecommunications system grows, additional loads may be added to the system, necessitating power supply system upgrades. In modular power supply systems, additional rectifier subsystems can be plugged in to increase the power delivery capacity. This may necessitate adding additional backup batteries, as well. When engineers or technicians make such upgrades, they need a clear, easy to use interface through which they will set the operating parameters of the newly added equipment. If any real-time values, reflecting operating currents, voltages, temperatures and the like, are not within expected ranges, the engineer needs to be able to quickly identify the cause.

The present invention provides a remote user interface system that will allow a remote browser application to monitor and control the power system from anywhere in the world. The interface system further supports a local user interface, such as in the form of a liquid crystal display screen and touchpad interface, to provide the same information that is available through the remote browser. Preferably the local interface and the remote browser interface are configured as a series of menu screens providing both static and dynamic (real-time) information. Preferably the screens of the remote browser interface and the local interface are of the same or similar layout so that the user of the remote browser interface will be familiar with the local interface, and vice versa.

The remote user interface system employs a monitor and control system that is coupled to the electric power supply system for obtaining operating state information from at least one of the subsystems of the power supply. The monitor and control system also provides operating state information to at least one of the subsystems of the power supply. A data storage system associated with the monitor and control system stores the state information. A user interface manager is coupled for accessing the data storage system. In the preferred embodiment the user interface manager can both read from and write to the data storage system, thereby datalogically linking the user interface manager with the power supply subsystems.

The user interface manager is operative to deliver an executable Java applet to the remote browser application. The applet generates a user interface within the browser application for monitoring and controlling the electric power supply system. In the preferred embodiment the user interface manager is configured to supply selected state information to the applet for display by the remote browser within the remote user interface. The user interface manager is further configured to receive data values generated by the applet in response to user interaction through the user interface. It communicates these data values to the data storage system for use in controlling the electric power supply system.

Further in accordance with the invention, the remote user interface system generates a plurality of linked pages containing both static text and/or graphical information and also dynamic (real-time) information. The real-time information reflects actual operating conditions within the power supply system, such as voltages, currents, temperatures, time intervals, and the like. This dynamically-displayed content also represents active regions with which the user may interact. For example, the user can select an active region, such as a voltage, by manipulating the user interface cursor until it points to that region. Then, by selecting or clicking on the region, a subsequent page is automatically displayed, showing additional static and/or dynamic information that has a potential bearing on the real-time data previously displayed. Thus, if the user wishes to ascertain why a particular operating voltage is too high, he or she simply clicks on the displayed voltage value and a subsequent screen is displayed, showing control settings and other parameters that have an effect on that operating voltage. Thus the user interface is quite intuitive and easy to use.

For a more complete understanding of the invention, its objects and advantages, refer to the following specification and to the accompanying drawings.

DETAILED DESCRIPTION OF THE PREFERRED EMBODIMENT

Figure 1:
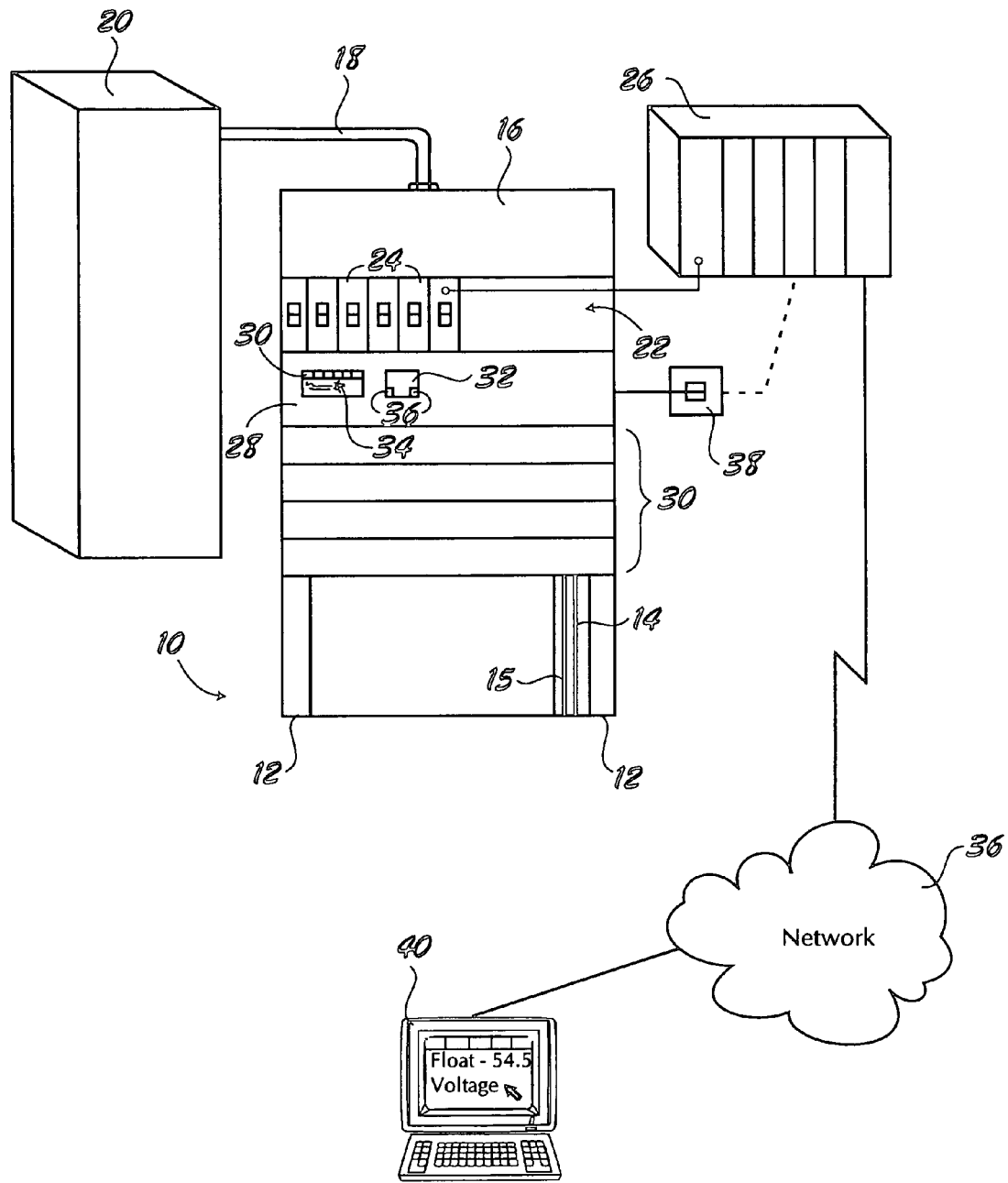
FIG. 1 is a front view of an exemplary electric power supply system, illustrating how the modular subsystems may be configured.

An exemplary power supply system is illustrated at 10 in FIG. 1. The system of the illustrated embodiment employs a rackmount unit having mounting rails 12 that supports a common bus structure that includes a data bus 14 and a DC power bus 15 to which a plurality of individual power supply system components are attached. Illustrated in FIG. 1 is a modular battery connection unit 16 connected through suitable heavy duty cables 18 to a battery supply 20. A modular power distribution unit 22 houses a plurality of individual circuit breakers 24, which supply operating power to the telecommunications equipment 26. The system also includes a modular master control unit 28 and a plurality of modular rectifier units 30 (four rectifier units are illustrated in FIG. 1).

The master control unit 28 has a local user interface, preferably in the form of a display panel 30, such as an LCD panel and a touchpad pointing device 32. The user interacts with the local user interface by manipulating the touchpad 32 to, in turn, manipulate the cursor 34 displayed on panel 30. By tapping the touchpad or pressing the left and right selector buttons 36, the user can select various menu screens to control the power supply system as will be more fully described below.

The master control unit is coupled through a suitable interface to a computer network such as the Internet. In FIG. 1 the network has been generically illustrated at 36 and the master control unit is shown connected through a telephone interface jack 38 to the telecommunications unit 26. While a telephone connection has been illustrated here, it will be appreciated that the master control unit could be connected to network 36 by other types of connections.

In accordance with one aspect of the invention a remote user interface is provided through a suitable computer or workstation such as computer 40. Computer 40 is attached to network 36 so that it may communicate with the master control unit 28 through the network connection provided. Computer 40 hosts a browser application, such as a web browser application, which in turn runs a remote user interface applet. The applet provides connectivity with the master control unit 28 and allows the user to fully interact with the control unit through the remote browser interface.

In the presently preferred embodiment, the power supply units illustrated in FIG. 1 are designed for modular interconnectivity. Each of the modular units includes supporting hardware and software for communicating over data bus 14. While the modular units are capable of peer-to-peer communication, the presently preferred embodiment places the primary control functions within the master control unit 28. The reserve power unit 16, power distribution unit 22 and rectifier units 30 are provided with processors, referred to as "neurons," that handle the monitoring, control and communications functions associated with these modules. The master control unit includes a more powerful processor that runs the controller software that coordinates operation of the other modules as well as providing the user interface functionality.

The presently preferred embodiment employs a networked connection between the processor of the master control unit and the neurons of the other modules that make up the system. Communication is effected over bus 14 using the CAN bus protocol. The master control unit and each of the neurons associated with the other modules contain the necessary hardware and driver software for communicating over the CAN bus. Although other protocols may be used, the CAN bus protocol is presently preferred because it is relatively robust in the presence of electrical noise such as would be expected in a power system.

Figure 2:
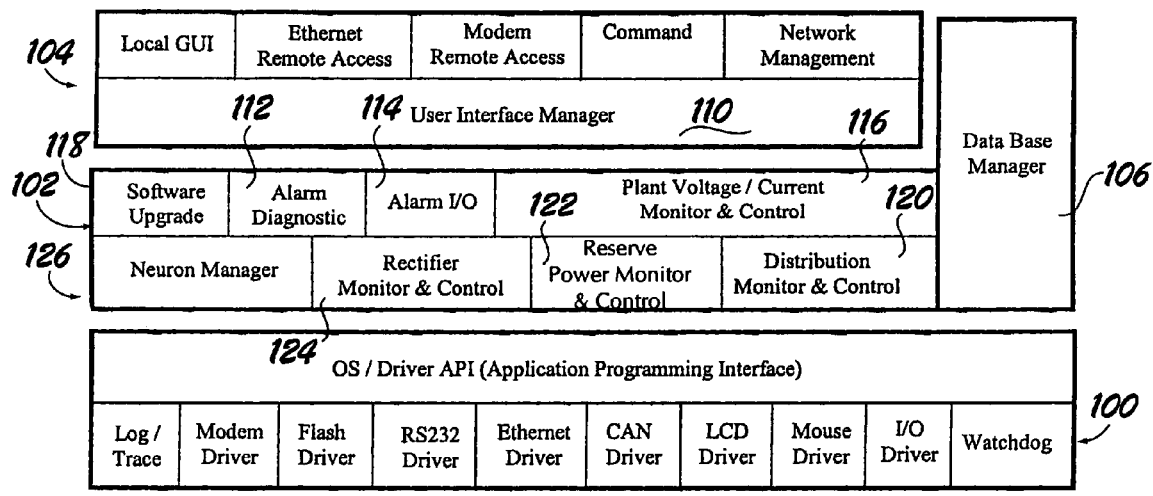
FIG. 2 is a software layer diagram illustrating the software environment in which the presently preferred remote user interface system may be implemented.

To better understand how the remote user interface works, an overview of the presently preferred software architecture for the master controller will be presented. Referring to FIG. 2, the software architecture may be defined in terms of three interacting layers: low level layer 100, real-time layer 102 and user interface layer 104. Although other operating systems may be used, the presently preferred embodiment uses the QNX operating system which provides a real-time multitasking environment. The low level layer 100 consists of the low level drivers for communication and hardware interface, such as modem, Ethernet, RS-232, CAN, LCD display, pointing device, I/O interface, flash memory, watchdog and trace/log. Layer 100 provides services to the real-time layer 102 through an application programming interface (API). In this way, applications running in the real-time layer may be decoupled from hardware platform dependence.

Real-time layer 102 provides monitor and control functions for each of the reserve power module, power distribution module and rectifier modules as well as plant voltage and current monitoring and control functions applicable to the entire power supply system. In addition, alarm condition monitoring and diagnostic functions and software upgrade functions are provided in real-time layer 102.

User interface layer 104 provides the functionality for supporting both local and remote user interface control of the modules in the real-time layer 102. The preferred embodiment implements remote access through a web-based user interface through either an Ethernet or modem connection using TCP/IP and modem drivers found in layer 100.

Figure 4:
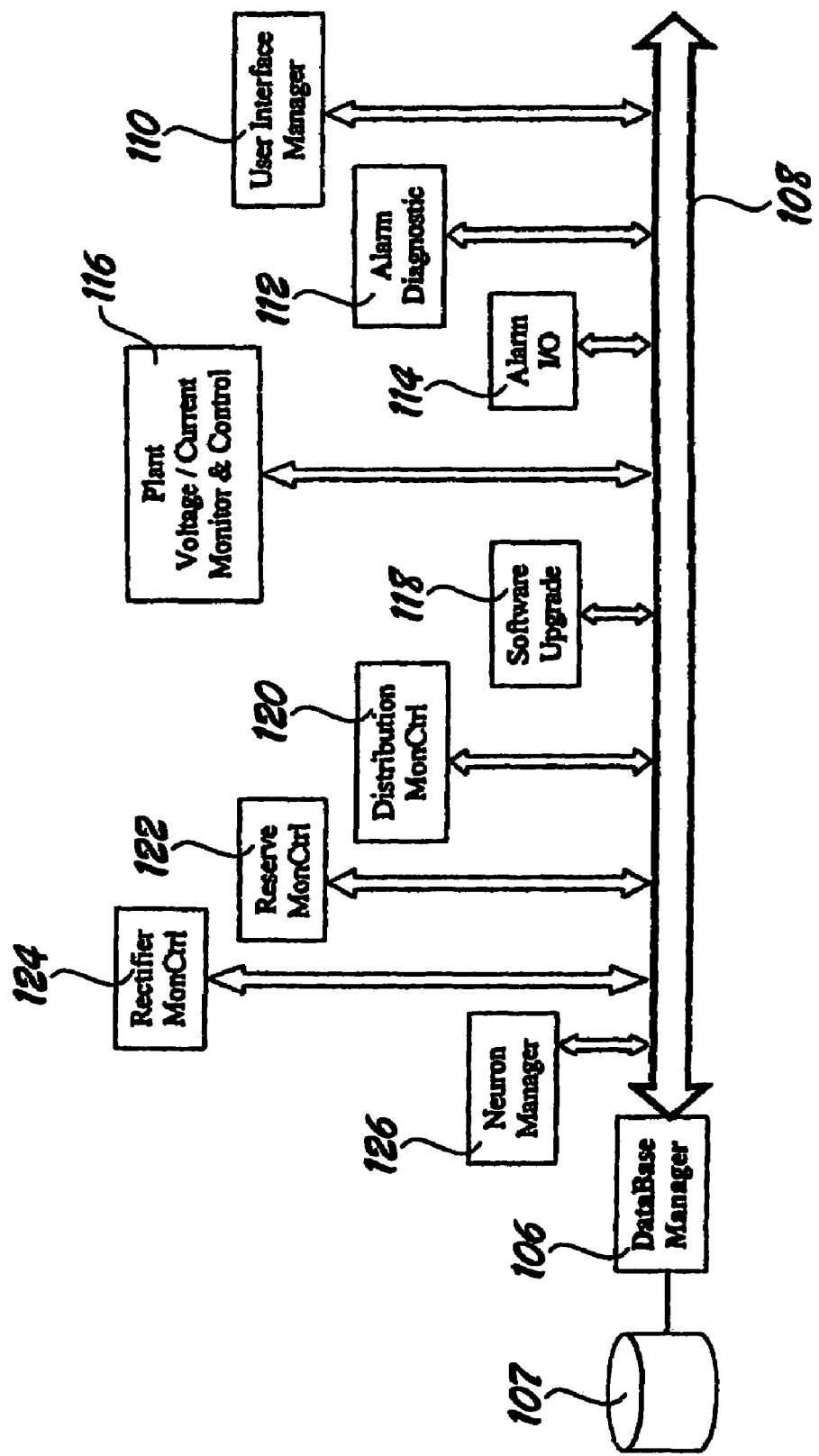
FIG. 4 is a block diagram illustrating the inter-module interface whereby components of the remote user interface system communicate with one another.

The user interface layer and the real-time layer communicate through access to a shared database 107 that is administered by database manager 106. FIG. 4 illustrates how the various modules within layers 102 and 104 communicate via the database manager 106. The database manager implements a "soft" data bus 108 which provides a communication backbone within the controller software. The soft data bus enables module plugability, making it easy to add additional modules when upgrading or enhancing the controller software. Modules connected to the database manager (and thereby connected to the soft data bus 108)

interact with each other by reading from and writing to the database 107 being administered by database manager 106.

Thus if the user wishes to access an alarm diagnostic value, for example, the user would interact through the user interface manager 110 (a component within layer 104) to read the alarm diagnostic values obtained from the database 107 by database manager 106. The alarm diagnostic module 112 operating in conjunction with alarm input/output module 114 (a component within layer 102) is responsible for writing values to database 107 that are accessed by the user interface manager when interrogating the alarm diagnostic conditions.

By way of further example, if the user wishes to ascertain the current power plant voltage, the user interface manager 110 is again used. This time the user interface manager will request database manager 106 to obtain values stored in database 107 that have been written to the database by the plant voltage/current monitor and control module 116. Similar connectivity is provided between the user interface manager and software upgrade module 118, power distribution monitor and control module 120, reserve power monitor and control module 122, rectifier monitor and control module 124 and neuron manager 126.

Figure 3:
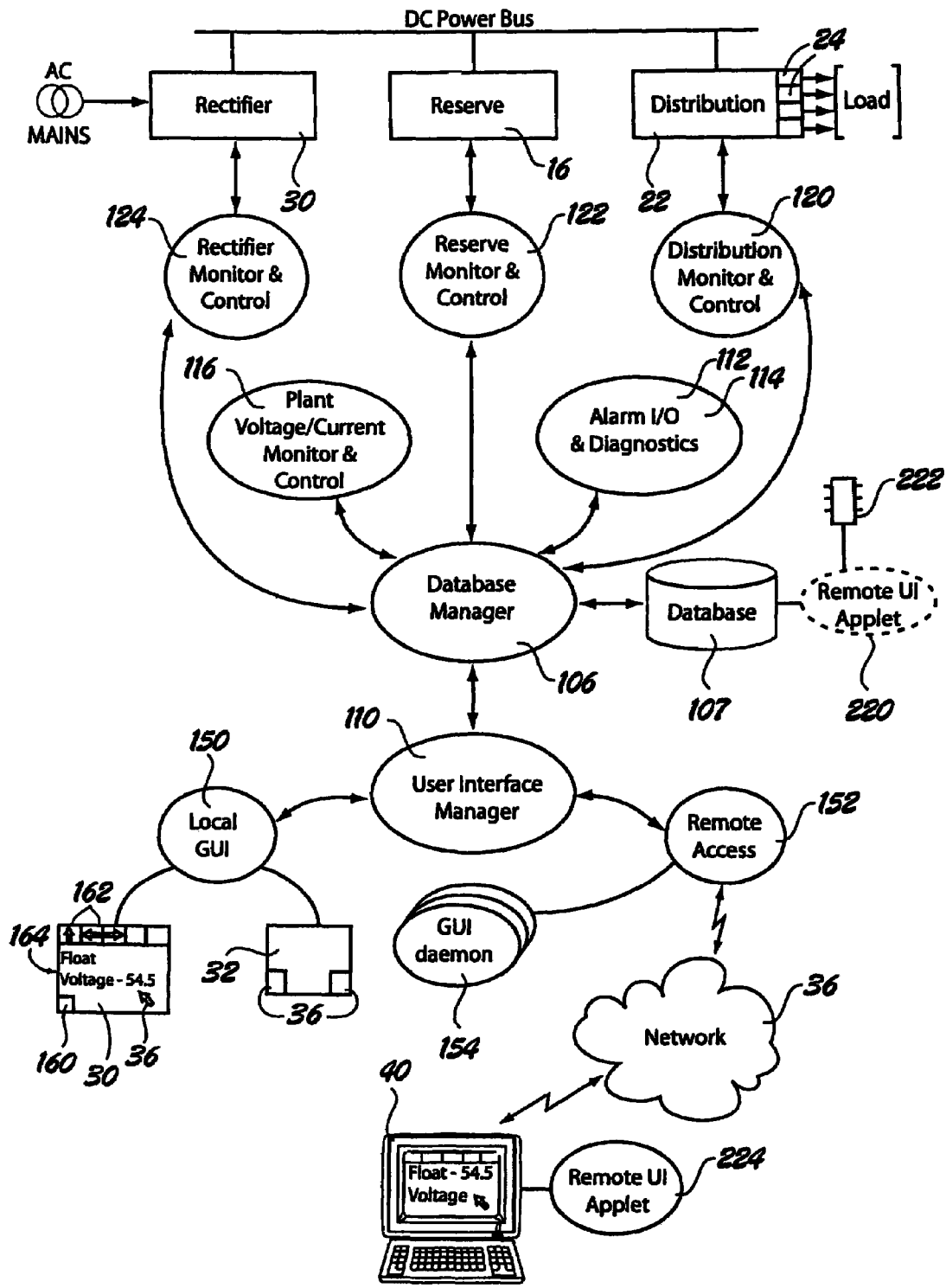
FIG. 3 is data flow diagram illustrating a presently preferred embodiment of the user interface system.

FIG. 3 provides a different view of how the modules within the presently preferred software architecture interact with one another to provide the remote user interface functionality. FIG. 3 is a dataflow diagram in which communication between modules is illustrated using interconnecting lines with double-headed arrows and in which associations or relationships between modules and/or components are shown by lines without arrows. Database manager 106 and its associated database 107 are illustrated in the center of the diagram. The user interface manager 110 and the various monitor and control modules 116, 120, 122 and 124 communicate with the database manager. The rectifier monitor and control module 124, in turn, communicates with the rectifier unit 30; reserve monitor and control module 122 communicates with the reserve power unit 116; and distribution and control module 120 communicates with the distribution unit 22. AC power is supplied from the AC mains to the rectifier unit(s) 30, which in turn supply DC power over the DC power bus to both the reserve power unit 16 and the distribution unit 22. Thus energy from the rectifier units is supplied to both power any loads attached to the distribution unit through breakers 24 and also to maintain the reserve power batteries at full charge. In the event the AC mains are lost, due to a power outage, the reserve power unit 16 supplies DC power via the DC power bus 15 to the distribution unit 22 so that the loads will continue to operate uninterrupted.

The user interface manager 110 supports both local and remote interface functionality. Local interface functionality is provided through a local graphical user interface (GUI) module 150 while remote user interface functionality is provided through a remote access module 152. The remote access module will support multiple communication sessions concurrently. For each communication session a graphical user interface (GUI) daemon 154 is instantiated. The presently preferred remote user interface is designed to work using the TCP/IP protocol employed by the Internet. The GUI daemon 154 processes TCP/IP packets, packaging information sent by remote access module 152 over the network 36 and unpackaging packets sent to the remote access module from the network 36.

The local GUI module 150 is designed to receive user input through a touchpad 32 having pushbuttons 36 to simulate the right and left mouseclick buttons of a computer graphical user interface. The local GUI 50 also works with display panel 30 on which a graphical cursor 36 is displayed. The user can make menu selections by manipulating the cursor using touchpad 32. In the illustrated embodiment menus are accessible through a button 160 in the lower left-hand corner of the screen. The user can also select navigation buttons 162 that simulate the Home, Back and Forward buttons commonly found on web browsers. The user can also select displayed text that appears in the center portion of the display screen as at 164. The displayed text can either be static text that does not change during system operation or dynamic text that does change during system operation. Typically the dynamic text is tied to real-time values measured by one of the monitor and control modules (e.g. modules 116 120, 122 and 124) or from the alarm and diagnostic modules (e.g. modules 112 and 114).

Clicking on or selecting a dynamically displayed value, such as the float voltage value, for example, causes the user interface manager to display a different screen that is relevant to the float voltage value. Thus, clicking on the numeric value "−54.5" in the illustrated local display 30 would cause a new screen to be displayed showing other measured values and parameters that affect the float voltage. The user could then make changes to these settings by selecting new settings from a pull-down menu box or other graphical user interface input technique. The new setting would then be communicated through the user interface manager to the database manager 106 for entry into database 107. The monitor and control module or modules that use this setting would then access the database to obtain the new setting and make adjustments to the appropriate modules as needed to effect the new setting. This could in turn cause changes in measured values (e.g., float voltage) which would be communicated by the respective monitor and control modules to the database manager for writing into the database 107.

Figure 5:
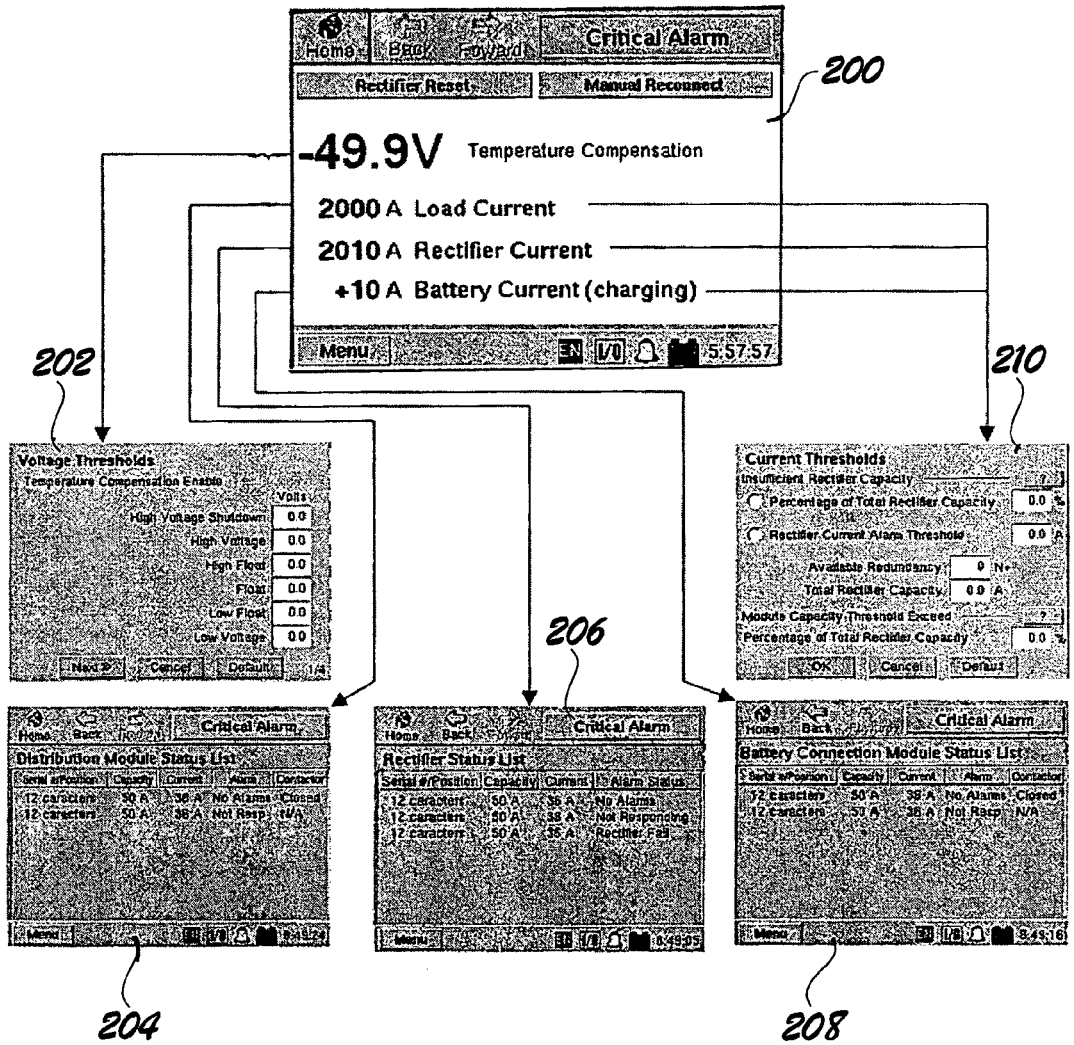
FIG. 5 is a set of user interface diagrams, illustrating how active and static regions are linked in the presently preferred remote user interface system

An exemplary set of user interface screens has been illustrated in FIG. 5. From the main graphical user interface screen 200, the user can navigate to a variety of different screens. Five subscreens are illustrated in FIG. 5. Clicking on the dynamically displayed value for temperature compensation takes the user to screen 202 where various voltage thresholds can be set. Clicking on the dynamically displayed load current value takes the user to the distribution module status list screen 204. Clicking on the dynamically displayed rectifier current value takes the user to screen 206, which shows the rectifier status list. Clicking on the dynamically displayed battery current takes the user to screen 208, which shows the battery connection module status list. Clicking on static text regions such as the text reading "Load Current", "Rectifier Current" or "Battery Current" takes the user to the Current Thresholds screen 210. In this screen the user can change current threshold settings by selecting radio buttons or by entering values in the text boxes illustrated. If desired, the local GUI module 150 (FIG. 3) can support a keypad entry device for entering numbers into the value fields such as those shown in screens 202 and 210 of FIG. 5. Alternatively, a pop-up keypad applet can be displayed on the user interface screen, allowing the user to enter numbers by clicking on digits in the displayed keypad.

The remote user interface of the preferred embodiment is designed to simulate the functionality and appearance of the local graphical user interface. This is accomplished through a remote user interface applet. The remote user interface applet is a stored application program that may be stored in the master control unit 28 for distribution as needed. The applet may be stored in non-volatile memory within the controller, which may be optionally associated with the database manager 106 and database 107. The remote user interface applet is shown in dashed lines at 220 in FIG. 3 to illustrate that the applet may be stored in database 107 or within some other memory device such as a read only memory ROM, flash memory or the like. Such memory is illustrated diagrammatically at 222 in FIG. 3.

The remote user interface applet is downloaded by the user interface manager through the remote access module 152 to the workstation or computer 40. Computer 40 may run a standard web browser and may be suitably connected to network 36 to support TCP/IP communication. If the connection to network 36 is by modem, additional PPP protocols may be used to establish the Internet connection. Once the remote applet is downloaded to computer 40 it runs in the memory of computer 40 as illustrated diagrammatically at 224.

The remote user interface applet provides several functions. First, it generates the static display screens (text and graphics) to mimic the appearance of the screens on the local user interface. Of course, because computer 40 will typically have a larger display area than the local display, the remotely displayed user interface can have additional displayed content as well. The remote user interface applet is also involved in displaying dynamically generated information and for sending control information back to the master control unit. When the user wishes to read a value within the power supply system, or wishes to change a setting or value, used by the power supply system, the user interacts with the remote user interface screen. The applet, in turn, constructs a message that identifies not only the parameter or setting entered by the user, but also the screen descriptor and field identifier so that the context of the user's entry may be fully defined. The remote user interface applet then packages this message in a TCP/IP packet or series of packets and sends it through the network to the remote access module 152.

Once received by the remote access module the associated GUI daemon 154 unpacks the TCP/IP message, extracts the enclosed message sent by the remote user interface applet and passes this information to the user interface manager. The user interface manager then interprets the message by parsing it into its constituent parts. At this point, the user interface manager uses the constituent part information the same way as it would use information from the local GUI module 150.

Figure 6:
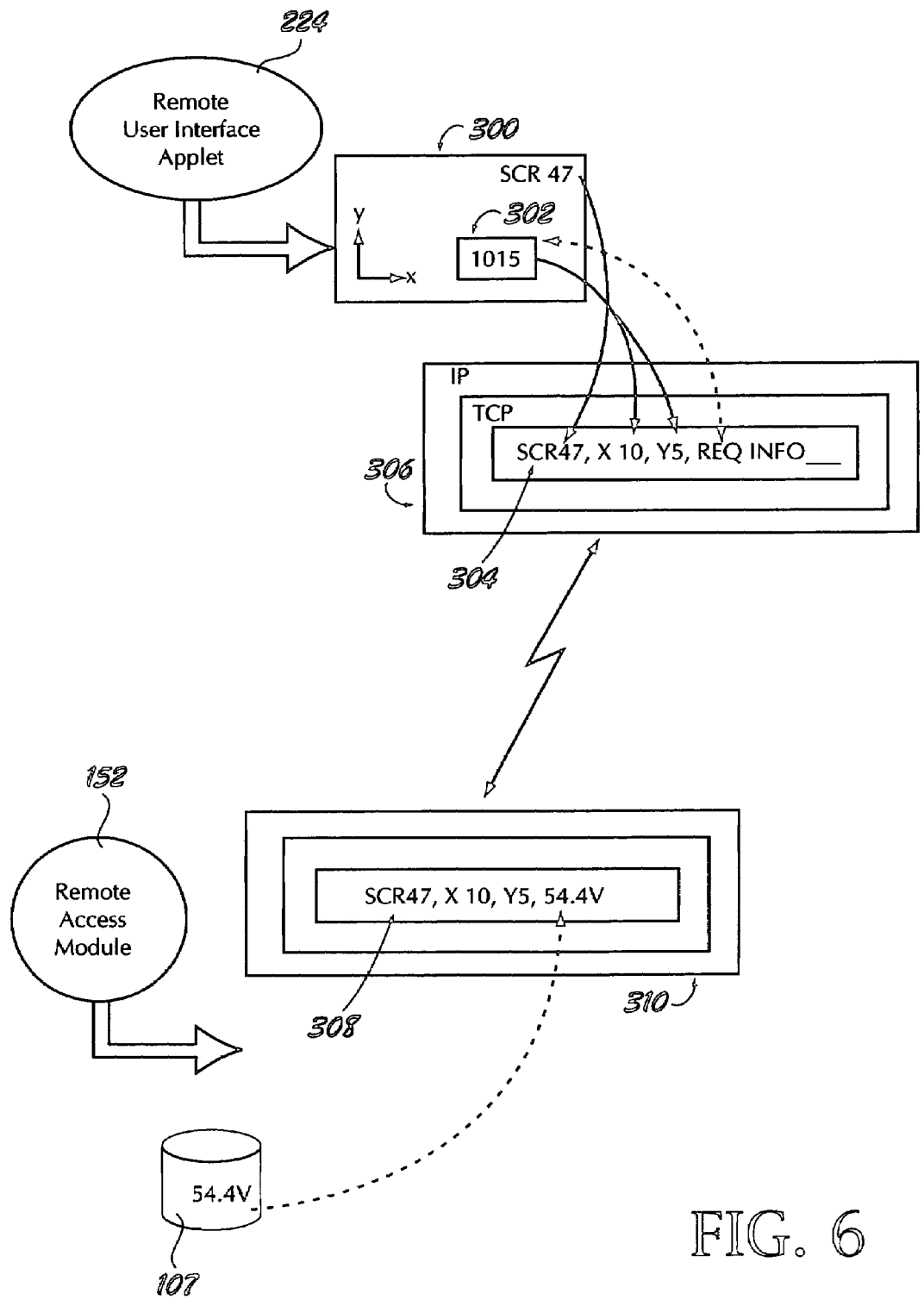
FIG. 6 is a data structure diagram illustrating the messaging technique employed by the remote user interface applet when communicating with the remote access module of a local master control unit.

FIG. 6 diagrammatically illustrates how the remote user interface applet may package a request for information, such as a request for a particular voltage value stored in database 107. The remote user interface applet generates screen 300, which may have a screen identifier I.D. value of SCR 47. The requested voltage value may be physically located in a dynamically changing field 302 at (X,Y) position (10, 5). The remote user interface applet would thus construct message 304 to embed the screen identifier, the X and Y position values, and optionally a setting or value to be communicated to the master control unit 28. In this case, the particular message being sent is a request for information from the database. Thus a suitable request information code may be embedded in message 304.

The remote user interface applet then packages message 304 within a TCP/IP packet 306 and the packet is sent over the Internet or other suitable connection to the remote access module 152 within the master control unit (FIG. 3). The GUI daemon 154 associated with the remote access module unpacks the message 304 and the user interface manager then parses the message to determine that the user is on screen 47 at X,Y location (10, 5). Because the message is a request for information, the user interface manager passes the request to database manager 106 for a database lookup operation. The database manager obtains the current value of the requested information and passes it back to the user interface manager, which in turn passes the value to the remote access module 152. The remote access module then, using the services of GUI daemon 154, constructs a reply message 308 that contains the screen I.D., the X and Y values and the requested value obtained by database lookup. In the example illustrated in FIG. 6, the requested information is a voltage: 54.4V.

The remote access module bundles message 308 within a TCP/IP packet or packets 310 and the packet is sent back to the remote user interface applet 224 so that the value may be displayed in field 302 of the display screen 300. In this way, the remote user interface applet is able to obtain values reflecting current operating conditions from the master control unit. The applet can also send operating parameters, such as those input by the user through a suitable dialogue box, pull-down menu, radio button or the like. To send control values to the master control unit the remote user interface applet constructs a message similar to that shown at 304, except that the command would be an instruction to write a value to the database and would provide the appropriate value as supplied by the user. The remote access module would then unpack the message at the master control unit and place that value in the database for use by the other modules.

From the foregoing it will be appreciated that the user interface of the invention provides a powerful graphical user interface for convenient control of a power supply system by both a local operator and a remote operator through a suitable web browser. Because the remote user interface and the local user interface offer the same functionality, knowledge obtained at either a local facility or a remote facility is easily transferred to the other facility. Thus an engineer working at a local power supply site would readily be able to interact with the system through a remote web browser connection without having to learn a new user interface. By being able to interrogate a number of different facilities from a single web browser at a remote location, one engineer can now do the job of many. This can significantly lower the cost to operate a power supply system within a telecommunications operation.

While the invention has been described in its presently preferred form, it will be understood that the invention is capable of modification without departing from the spirit of the invention as set forth in the appended claims.

What is claimed is:

1. A remote user interface system to enable a remote browser application to monitor and control a power system of the type having one or more rectifier subsystems, one or more reserve power subsystems and one or more power distribution subsystems, comprising:
   a monitor and control system coupled to said power system for obtaining operating state information from at least one of said subsystems and for providing operating state information to at least one of said subsystems;
   a data storage system associated with said monitor and control system for storing said operating state information; and
   a user interface manager capable of accessing said data storage system and being operative to:
   (a) provide an executable applet to said remote browser application, the applet generating a remote user interface within said browser application for monitoring and adjusting settings and thresholds of at least one of said subsystems;

(b) supply selected operating state information to said applet for display by said remote browser within said remote user interface; and (c) receive data values generated by said applet in response to user interaction via said remote user interface and to communicate said data values to said data storage system for use in adjusting said settings and thresholds, said applet constructing a message that identifies, in addition to the data value, a screen descriptor and field identifier defining context of the data value in terms of a local user interface of said user interface manager, said remote user interface simulating functionality and appearance of said local user interface, wherein said remote browser displays adjustable static state information within said user interface when dynamic state information that is affected by said static state information is selected in response to said user interaction.

2. The remote user interface system of claim 1 wherein said user interface manager communicates with said applet using data packets compatible with an internet protocol.

3. The remote user interface system of claim 1 wherein said user interface manager also supports a local user interface associated with said monitor and control system.

4. The remote user interface system of claim 1 wherein said user interface manager also supports a local user interface that includes a touchpad input mechanism for user interaction with the power system.

5. The remote user interface system of claim 1 further wherein said user interface manager generates at least one display screen containing both static and dynamic content.

6. The remote user interface system of claim 5 wherein said dynamic content represents said operating state information.

7. The remote user interface system of claim 1 wherein said user interface manager generates at a plurality of display screens, at least a portion of which contain dynamic content representing said operating state information, and wherein at least one of said applet and said user interface manager generates hyperlinks connecting said dynamic content with other display screens.

8. The remote user interface system of claim 1 wherein said monitor and control system includes a rectifier monitor and control module for obtaining operating state information from at least one of said rectifier subsystems.

9. The remote user interface system of claim 1 wherein said monitor and control system includes a reserve monitor and control module for obtaining operating state information from batteries attached to said power system.

10. The remote user interface system of claim 1 wherein said monitor and control system includes a distribution monitor and control module for obtaining operating state information from said power distribution subsystem.

11. The remote user interface system of claim 1 wherein said remote browser application is an internet web browser application.

12. A remote user interface system to enable a remote browser application to monitor and control a power system, comprising:

a monitor and control system coupled to said power system for obtaining operating state information about said power supply system and for providing operating state information to said power system;

a data storage system associated with said monitor and control system for storing said operating state information; and a user interface manager capable of accessing said data storage system and being operative to provide an executable applet to said remote browser application, the applet generating a remote user interface within said browser application for monitoring and adjusting settings and thresholds of said power system, wherein said remote browser displays adjustable static state information within said user interface when dynamic state information that is affected by said static state information is selected via said user interface, said applet constructing a message that identifies, in addition to a data value generated by said applet in response to user interaction via said remote user interface, a screen descriptor and field identifier defining context of the data value in terms of a local user interface of said user interface manager, said remote user interface simulating functionality and appearance of said local user interface.

13. The remote user interface system of claim 12 wherein said user interface manager communicates with said applet using data packets compatible with an internet protocol.

14. The remote user interface system of claim 12 wherein said user interface manager also supports a local user interface associated with said monitor and control system.

15. The remote user interface system of claim 12 wherein said user interface manager also supports a local user interface that includes a touchpad input mechanism for user interaction with the power system.

16. The remote user interface system of claim 12 further wherein said user interface manager generates at least one display screen containing both static and dynamic content.

17. The remote user interface system of claim 16 wherein said dynamic content represents said operating state information.

18. The remote user interface system of claim 12 wherein said user interface manager generates at a plurality of display screens, at least a portion of which contain dynamic content representing said operating state information, and wherein at least one of said user interface manager and said applet generates hyperlinks connecting said dynamic content with other display screens.

19. The remote user interface system of claim 12 wherein said monitor and control system includes a rectifier monitor and control module for obtaining operating state information from at least one of said rectifier subsystems.

20. The remote user interface system of claim 12 wherein said monitor and control system includes a reserve monitor and control module for obtaining operating state information from batteries attached to said power system.

21. The remote user interface system of claim 12 wherein said monitor and control system includes a distribution monitor and control module for obtaining operating state information from said power distribution subsystem.

22. The remote user interface system of claim 12 wherein said remote browser application is an internet web browser application.

23. A method of controlling a telecommunications power system, comprising:

delivering an executable applet to a browser application running on a computer that communicates with said telecommunications power system via a network;

using a processor powered by said telecommunications power system to obtain operating state information about said telecommunications power system;

communicating said operating state information to said applet via said network;

sending control information generated by said applet to said processor via said network, said applet constructing said control information as a message that identifies, in addition to a data value generated by said applet in response to user interaction via a remote user interface provided by said applet, a screen descriptor and field identifier defining context of the data value in terms of a local user interface of a user interface manager, said remote user interface simulating functionality and appearance of said local user interface;

using said control information to adjust settings and thresholds of said telecommunications power system; and displaying adjustable static state information within said browser application when dynamic state information that is affected by said static state information is selected via said applet.

24. The method of claim 23 further comprising using said processor to store said operating state information in a database administered by said processor.

25. The method of claim 23 further comprising using said processor to store said control information generated by said applet in a database administered by said processor.

26. The method of claim 23 further comprising generating a user interface display within said browser application that includes said operating state information.

27. The method of claim 23 further comprising generating a user interface display within said browser application that includes static information and dynamic information, the dynamic information being based on said operating state information.

28. The method of claim 27 wherein said applet generates a plurality of display screens in which at least a portion of said dynamic information on one of said display screens defines a hyperlink relationship with another of said display screens.

* * * * *